United States Patent
Kondameedi et al.

(10) Patent No.: US 9,643,282 B2
(45) Date of Patent: May 9, 2017

(54) MICRO END MILL AND METHOD OF MANUFACTURING SAME

(71) Applicant: Kennametal Inc., Latrobe, PA (US)

(72) Inventors: Naveen Kondameedi, Sylvania, OH (US); David A. Arns, Maumee, OH (US)

(73) Assignee: KENNAMETAL INC., Latrobe, PA (US)

( * ) Notice: Subject to any disclaimer, the term of this patent is extended or adjusted under 35 U.S.C. 154(b) by 187 days.

(21) Appl. No.: 14/517,347

(22) Filed: Oct. 17, 2014

(65) Prior Publication Data

US 2016/0107264 A1   Apr. 21, 2016

(51) Int. Cl.

| | |
|---|---|
| B23C 3/00 | (2006.01) |
| B23K 26/402 | (2014.01) |
| B23C 5/10 | (2006.01) |
| B23K 1/00 | (2006.01) |
| B23K 26/36 | (2014.01) |
| B23K 26/0622 | (2014.01) |
| B23K 26/146 | (2014.01) |
| B23P 15/34 | (2006.01) |
| B23K 103/00 | (2006.01) |
| B23K 103/04 | (2006.01) |

(Continued)

(52) U.S. Cl.
CPC ............. *B23K 26/402* (2013.01); *B23C 5/10* (2013.01); *B23C 5/1009* (2013.01); *B23K 1/0008* (2013.01); *B23K 26/0622* (2015.10); *B23K 26/146* (2015.10); *B23K 26/36* (2013.01); *B23P 15/34* (2013.01); *B23C 2210/03* (2013.01); *B23C 2226/125* (2013.01); *B23C 2226/315* (2013.01); *B23K 2201/002* (2013.01); *B23K 2201/20* (2013.01); *B23K 2203/04* (2013.01); *B23K 2203/18* (2013.01); *B23K 2203/52* (2015.10)

(58) Field of Classification Search
CPC ........ B23B 2228/00; B21F 5/003; B21F 7/06; B21C 3/025

See application file for complete search history.

(56) References Cited

U.S. PATENT DOCUMENTS

| 385,088 A | 6/1888 | Benzie |
|---|---|---|
| 864,756 A | 8/1907 | Phillips |

(Continued)

FOREIGN PATENT DOCUMENTS

| CN | 201172120 Y | 12/2008 |
|---|---|---|
| CN | 102328126 A | 1/2012 |

(Continued)

*Primary Examiner* — Will Fridie, Jr.
(74) *Attorney, Agent, or Firm* — Ian K. Samways

(57) ABSTRACT

A micro end mill includes a shank made of a first material and a cutting tip made of a second, different material that is bonded to the shank. The first material can be, for example, carbide or high speed steel (HSS), and the second material can be, for example, cubic boron nitride (CBN), polycrystalline cubic boron nitride (PCBN), ceramic or polycrystalline diamond (PCD). The micro end mill is manufactured by producing a billet made of Superhard material using laser radiation, bonding the billet to a shank of the end mill, and removing material from the billet using laser radiation to produce a cutting tip made of the Superhard material. The laser radiation may comprise a laser beam encased in a water jet or a laser beam with a non-Gaussian intensity profile.

20 Claims, 7 Drawing Sheets

(51) Int. Cl.
  *B23K 101/00* (2006.01)
  *B23K 101/20* (2006.01)
  *B23K 103/18* (2006.01)

(56) References Cited

U.S. PATENT DOCUMENTS

| | | |
|---|---|---|
| 1,476,019 A | 12/1923 | Lowry |
| 1,781,863 A | 11/1930 | Shoemaker |
| 1,951,856 A | 3/1934 | Balke |
| 1,965,950 A | 7/1934 | Walker |
| 2,289,065 A | 7/1942 | Oliver |
| 2,289,344 A | 7/1942 | Cedarleaf |
| 2,682,414 A | 6/1954 | Richardson |
| 3,646,679 A | 3/1972 | Harding |
| 3,654,681 A | 4/1972 | Stein |
| 3,705,447 A | 12/1972 | Kollar |
| 3,754,309 A | 8/1973 | Jones |
| 3,857,305 A | 12/1974 | Lichtman |
| 3,911,543 A | 10/1975 | Sorice |
| 4,229,640 A | 10/1980 | Castellani |
| 4,373,518 A | 2/1983 | Kaiser |
| 4,459,458 A | 7/1984 | Vetsch |
| 4,481,016 A * | 11/1984 | Campbell ............... B21C 3/025 51/293 |
| 4,505,626 A | 3/1985 | Benhase |
| 4,591,302 A | 5/1986 | Lovendahl |
| 4,714,385 A | 12/1987 | Komanduri |
| 4,725,171 A | 2/1988 | DeTorre |
| 4,728,231 A | 3/1988 | Kunimori |
| 4,755,237 A | 7/1988 | Lemelson |
| 4,797,138 A | 1/1989 | Komanduri |
| 4,826,364 A | 5/1989 | Grunsky |
| 4,844,668 A | 7/1989 | Pettersson |
| 4,849,602 A | 7/1989 | Gardner |
| D305,498 S | 1/1990 | Lassiter |
| 4,898,499 A | 2/1990 | Tsujimura |
| 4,946,319 A | 8/1990 | Lyon |
| 4,987,800 A | 1/1991 | Gasan |
| 5,022,801 A | 6/1991 | Anthony |
| 5,026,960 A | 6/1991 | Slutz |
| 5,066,170 A | 11/1991 | Berryer |
| 5,078,551 A | 1/1992 | Oomen |
| 5,098,232 A | 3/1992 | Benson |
| 5,160,824 A | 11/1992 | Babel |
| 5,178,645 A | 1/1993 | Nakamura et al. |
| 5,181,321 A | 1/1993 | Gouttebarge |
| 5,195,404 A * | 3/1993 | Notter ............... B23B 51/02 407/118 |
| 5,205,680 A | 4/1993 | Lindstedt |
| 5,239,160 A | 8/1993 | Sakura |
| 5,247,923 A | 9/1993 | Lebourg |
| 5,272,940 A | 12/1993 | Diskin |
| 5,326,195 A | 7/1994 | Brox |
| 5,342,151 A | 8/1994 | Friedmann |
| 5,362,183 A | 11/1994 | Alario |
| 5,387,776 A | 2/1995 | Preiser |
| 5,388,484 A | 2/1995 | Bogner |
| 5,433,280 A | 7/1995 | Smith |
| 5,488,761 A | 2/1996 | Leone |
| 5,634,933 A | 6/1997 | McCombs |
| 5,643,523 A | 7/1997 | Simpson |
| 5,685,671 A | 11/1997 | Packer |
| 5,722,803 A | 3/1998 | Battaglia |
| 5,776,355 A | 7/1998 | Martin |
| 5,816,807 A | 10/1998 | Matsutani |
| 5,851,465 A | 12/1998 | Bredt |
| 5,853,268 A | 12/1998 | Simpson |
| 5,902,499 A | 5/1999 | Richerzhagen |
| 5,906,053 A | 5/1999 | Turner |
| 5,957,006 A | 9/1999 | Smith |
| 6,030,156 A | 2/2000 | Andronica |
| 6,146,476 A | 11/2000 | Boyer |
| 6,149,607 A * | 11/2000 | Simpson ............... A61B 10/06 600/564 |
| 6,161,990 A | 12/2000 | Oles |
| 6,200,514 B1 | 3/2001 | Meister |
| 6,274,206 B1 | 8/2001 | Turchan |
| 6,315,502 B1 | 11/2001 | Maurer |
| 6,315,505 B1 | 11/2001 | Moore |
| 6,353,204 B1 | 3/2002 | Spaay |
| 6,353,205 B1 | 3/2002 | Izard |
| 6,354,361 B1 | 3/2002 | Sachs |
| 6,394,466 B1 | 5/2002 | Matsumoto |
| 6,402,438 B1 | 6/2002 | Boyer |
| 6,413,286 B1 | 7/2002 | Swei |
| 6,447,560 B2 | 9/2002 | Jensen |
| 6,454,030 B1 | 9/2002 | Findley |
| 6,521,864 B2 | 2/2003 | Bertez |
| 6,524,036 B1 | 2/2003 | Kölker |
| 6,526,327 B2 | 2/2003 | Kar |
| 6,581,671 B2 | 6/2003 | Butcher |
| 6,607,533 B2 | 8/2003 | Del Rio |
| 6,612,204 B1 | 9/2003 | Droese |
| 6,629,559 B2 | 10/2003 | Sachs |
| 6,655,481 B2 | 12/2003 | Findley |
| 6,692,199 B2 | 2/2004 | Andersson |
| 6,712,564 B1 | 3/2004 | Hughes |
| 6,715,968 B1 | 4/2004 | Pär Tägtsträm |
| 6,733,603 B1 | 5/2004 | Wu |
| 6,776,219 B1 | 8/2004 | Cornie |
| 6,808,340 B2 | 10/2004 | Travez |
| 6,814,926 B2 | 11/2004 | Geving |
| 6,859,681 B1 | 2/2005 | Alexander |
| 6,929,426 B2 | 8/2005 | Thiele |
| 6,991,409 B2 | 1/2006 | Noland |
| 7,002,100 B2 | 2/2006 | Wu |
| 7,112,020 B2 | 9/2006 | Sheffler |
| 7,179,023 B2 | 2/2007 | Goudemond |
| 7,186,369 B1 | 3/2007 | Hardro |
| 7,189,032 B2 | 3/2007 | Goudemond |
| 7,226,254 B2 | 6/2007 | Friedrichs |
| 7,255,821 B2 | 8/2007 | Priedeman, Jr. |
| 7,258,720 B2 | 8/2007 | Fuwa |
| 7,313,991 B2 | 1/2008 | Penkert |
| 7,322,776 B2 | 1/2008 | Webb |
| 7,432,471 B2 | 10/2008 | Yamazaki |
| 7,461,684 B2 | 12/2008 | Liu |
| 7,496,424 B2 | 2/2009 | Froeschner |
| 7,533,713 B2 | 5/2009 | Pfeifer |
| 7,614,831 B2 | 11/2009 | Liu |
| 7,772,517 B2 * | 8/2010 | Glynn ............... B23B 27/14 219/69.17 |
| 7,832,456 B2 | 11/2010 | Calnan |
| 7,832,457 B2 | 11/2010 | Calnan |
| 7,930,054 B2 | 4/2011 | Slaughter |
| 8,052,765 B2 | 11/2011 | Cho |
| 8,109,350 B2 | 2/2012 | Fang |
| 8,178,033 B2 | 5/2012 | Dietrich |
| 8,221,858 B2 | 7/2012 | Mannella |
| 8,308,403 B2 | 11/2012 | Hecht |
| 8,318,076 B2 | 11/2012 | Wang |
| 8,333,814 B2 | 12/2012 | Brackin |
| 8,383,028 B2 | 2/2013 | Lyons |
| 8,398,396 B2 | 3/2013 | Taormina |
| 8,460,755 B2 | 6/2013 | Rodgers |
| 8,509,933 B2 | 8/2013 | Steingart |
| 8,522,646 B2 | 9/2013 | Laird |
| 8,534,963 B2 | 9/2013 | Luik |
| 8,551,395 B2 | 10/2013 | Belhadjhamida |
| 8,568,649 B1 | 10/2013 | Balistreri |
| 8,622,787 B2 * | 1/2014 | Sung ............... B24B 53/017 451/443 |
| 8,746,703 B2 | 6/2014 | Xu |
| 2001/0056309 A1 | 12/2001 | Jain |
| 2002/0040848 A1 * | 4/2002 | Sakurai ............... C23C 16/27 204/192.38 |
| 2003/0094730 A1 | 5/2003 | Dourfaye |
| 2003/0118412 A1 | 6/2003 | Fukui |
| 2003/0210963 A1 | 11/2003 | Kakai |
| 2004/0107019 A1 | 6/2004 | Keshavmurthy |
| 2004/0112647 A1 | 6/2004 | Meierhofer |
| 2004/0120778 A1 | 6/2004 | Lach |
| 2004/0221696 A1 | 11/2004 | Matsuhashi |
| 2004/0234349 A1 | 11/2004 | Ueda |

(56) References Cited

U.S. PATENT DOCUMENTS

| | | |
|---|---|---|
| 2005/0238451 A1 | 10/2005 | Hartman |
| 2006/0039818 A1 | 2/2006 | Tsai |
| 2006/0048615 A1 | 3/2006 | Treige |
| 2006/0144198 A1 | 7/2006 | Okajima |
| 2007/0163128 A1 | 7/2007 | Tarrerias |
| 2007/0212177 A1* | 9/2007 | Liu .................. B23B 27/005 407/113 |
| 2007/0283786 A1 | 12/2007 | Kappmeyer |
| 2008/0065259 A1 | 3/2008 | Dietrich |
| 2008/0075618 A1 | 3/2008 | Martin |
| 2008/0080937 A1 | 4/2008 | Hecht |
| 2008/0095968 A1 | 4/2008 | Semon |
| 2008/0253849 A1 | 10/2008 | Yoshinaga |
| 2008/0260964 A1 | 10/2008 | Bagavath-Singh |
| 2008/0292415 A1 | 11/2008 | Kuroda |
| 2009/0035075 A1 | 2/2009 | Hecht |
| 2009/0035411 A1 | 2/2009 | Seibert |
| 2009/0114628 A1 | 5/2009 | DiGiovanni |
| 2010/0172703 A1 | 7/2010 | Neubold |
| 2010/0178116 A1 | 7/2010 | Watanabe |
| 2010/0282026 A1 | 11/2010 | Luce |
| 2011/0097162 A1 | 4/2011 | Gey |
| 2011/0097976 A1 | 4/2011 | Mühlfriedel |
| 2011/0156304 A1 | 6/2011 | Walker |
| 2011/0167734 A1 | 7/2011 | Jiang |
| 2011/0210096 A1 | 9/2011 | Raji |
| 2011/0266068 A1 | 11/2011 | Eason |
| 2011/0291331 A1 | 12/2011 | Scott |
| 2012/0018924 A1 | 1/2012 | Swanson |
| 2012/0068378 A1 | 3/2012 | Swanson |
| 2012/0070523 A1 | 3/2012 | Swanson |
| 2012/0103701 A1 | 5/2012 | Cho |
| 2012/0135166 A1 | 5/2012 | Berglund |
| 2012/0141215 A1 | 6/2012 | Choi |
| 2012/0183802 A1 | 7/2012 | Bruck |
| 2012/0232857 A1 | 9/2012 | Fisker |
| 2012/0242007 A1 | 9/2012 | Coeck |
| 2012/0326356 A1 | 12/2012 | Martin |
| 2013/0015596 A1 | 1/2013 | Mozeika |
| 2013/0039799 A1 | 2/2013 | Bono |
| 2013/0040051 A1 | 2/2013 | Mourou |
| 2013/0059509 A1 | 3/2013 | Deopura |
| 2013/0088364 A1 | 4/2013 | Bittar |
| 2013/0101728 A1 | 4/2013 | Keremes |
| 2013/0101746 A1 | 4/2013 | Keremes |
| 2013/0105230 A1 | 5/2013 | Brackin |
| 2013/0136868 A1 | 5/2013 | Bruck |
| 2013/0161439 A1 | 6/2013 | Beery |
| 2013/0161442 A1 | 6/2013 | Mannella |
| 2013/0164960 A1 | 6/2013 | Swanson |
| 2013/0170171 A1 | 7/2013 | Wicker |
| 2013/0209600 A1 | 8/2013 | Tow |
| 2013/0220570 A1 | 8/2013 | Sears |
| 2013/0220572 A1 | 8/2013 | Rocco |
| 2013/0221191 A1 | 8/2013 | Sears |
| 2013/0223943 A1 | 8/2013 | Gey |
| 2013/0224423 A1 | 8/2013 | Mikulak |
| 2013/0247475 A1 | 9/2013 | Lind |
| 2013/0248260 A1 | 9/2013 | Ganz |
| 2013/0255346 A1 | 10/2013 | Danby |
| 2013/0277121 A1 | 10/2013 | Stevens |
| 2013/0287933 A1 | 10/2013 | Kaiser |
| 2014/0321927 A1 | 10/2014 | Craig |
| 2014/0321931 A1 | 10/2014 | Gey |

FOREIGN PATENT DOCUMENTS

| | | |
|---|---|---|
| CN | 202350533 A | 2/2012 |
| CN | 102990146 A | 3/2013 |
| DE | 19860585 A1 | 7/2000 |
| DE | 202006014223 U1 | 1/2007 |
| DE | 19901777 B4 | 8/2007 |
| DE | 102011076584 A1 | 11/2012 |
| EP | 191203 | 8/1986 |
| EP | 1537930 | 6/2005 |
| FR | 2801234 A1 | 5/2010 |
| JP | 9262714 A2 | 10/1997 |
| JP | 2004090192 A2 | 3/2004 |
| JP | 2004216483 | 8/2004 |
| JP | 201062677 A2 | 7/2010 |
| JP | 2012006135 A2 | 1/2012 |
| JP | 2012006134 A2 | 10/2012 |
| KR | 1020090132676 A | 12/2009 |

* cited by examiner

MICRO END MILL AND METHOD OF MANUFACTURING SAME

BACKGROUND OF THE INVENTION

Field of the Invention

The invention pertains to the field of rotary cutting tools. More particularly, the invention pertains to an end mill and a method of manufacturing the end mill using laser radiation to produce and process a billet made of Superhard material, such as Cubic Boron Nitride (CBN), Polycrystalline Cubic Boron Nitride (PCBN), Polycrystalline Diamonds (PCD), tungsten carbide (WC), and the like.

Description of Related Art

Cubic boron nitride or c-BN was first synthesized in 1957 by Robert H. Wentorf at General Electric, shortly after the synthesis of diamond. Cubic boron nitride is insoluble in iron, nickel, and related alloys at high temperatures, but it binds well with metals due to formation of interlayers of metal borides and nitrides. It is also insoluble in most acids, but is soluble in alkaline molten salts and nitrides, such as LiOH, KOH, NaOH/$Na_2CO_3$, $NaNO_3$ which are used to etch c-BN. Because of its stability with heat and metals, c-BN surpasses diamond in mechanical applications. The thermal conductivity of BN is among the highest of all electric insulators. In addition, c-BN consists of only light elements and has low X-ray absorptivity, capable of reducing the X-ray absorption background. With great chemical and mechanical robustness, c-BN has wide applications as abrasives, cutting tools, and even one of the popular X-ray membranes.

It is desirable to manufacture a micro cutting tool with a cutting tip made of Superhard material, such as c-BN or polycrystalline cubic boron nitride (PCBN). However, it is currently highly challenging to efficiently to manufacture a micro cutting tool having a cutting tip made of Superhard material because of the extremely small cutting diameter of between about 0.5 mm to about 10 mm.

Accordingly, there is a need in the art for an improved cutting tool, and in particular a micro cutting tool with a cutting tip with an extremely small cutting diameter that is made of a Superhard material.

SUMMARY OF THE INVENTION

The problem of providing a micro cutting tool, such as a micro end mill, with a cutting tip made of Superhard material is solved by using a non-grinding technique, such as laser radiation, electrical discharge machining (EDM), and the like, to produce a billet of the Superhard material, bonding the billet to a shank of the micro cutting tool, and removing material from the billet a non-grinding technique, such as laser radiation, electrical discharge machining (EDM), and the like, to produce a cutting tip made of the Superhard material with the desired shape.

In one aspect of the invention, a method of manufacturing a micro end mill with a cutting tip, comprises:
  producing a billet made of Superhard material using laser radiation;
  bonding the billet to a shank of the end mill, the shank made of different material than the billet; and
  removing material from the billet using laser radiation to produce a cutting tip made of the Superhard material.

In another aspect of the invention, an end mill is manufactured using the method of the invention.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
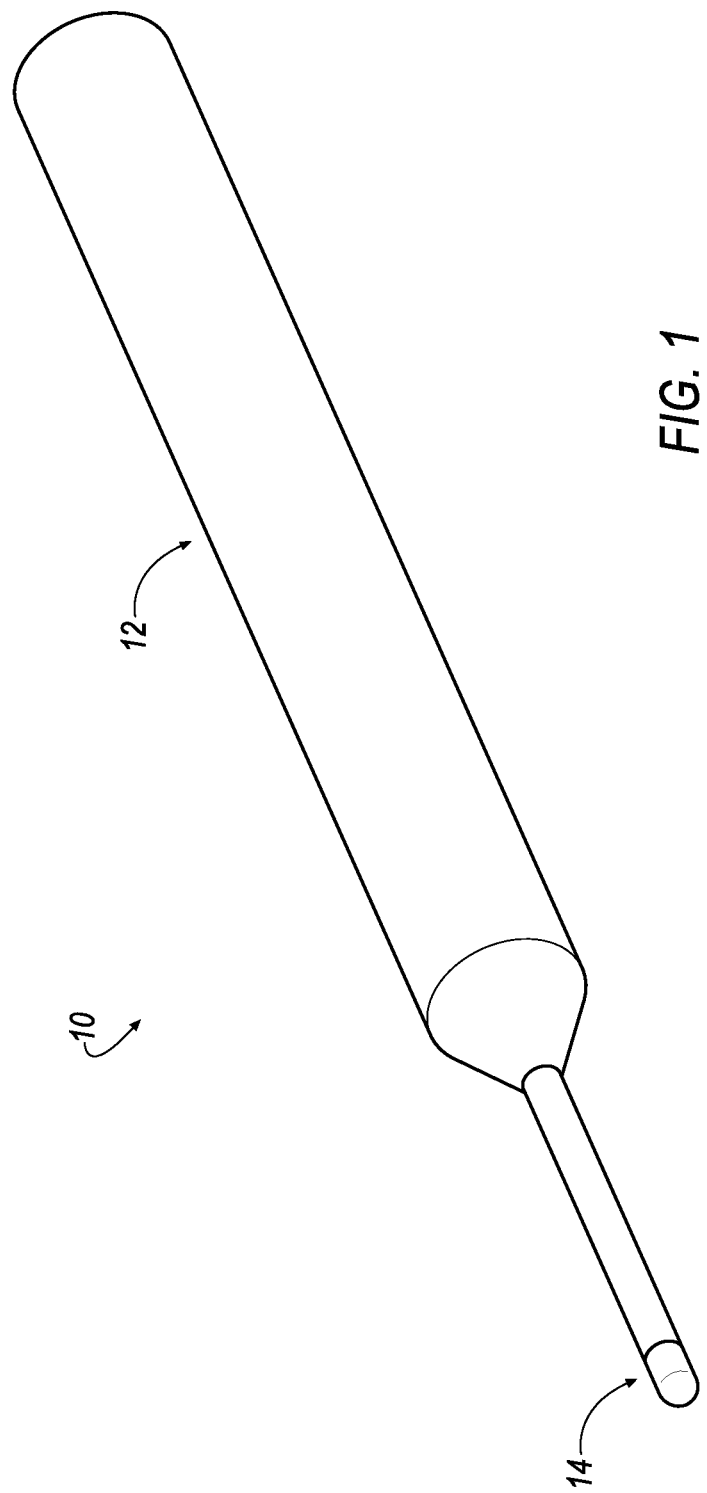
FIG. 1 is an isometric view of the micro end mill according to an embodiment of the invention.

Referring now to FIG. 1, wherein like numerals designate like components throughout all of the several figures, there is illustrated an end mill 10 according to an embodiment of the invention. In the illustrated embodiment, the end mill 10 comprises a micro end mill 10 including a shank 12 made of a first material, and a cutting tip 14 made of a second, different material. In one embodiment, the shank 12 is made of carbide or high speed steel (HSS), and the cutting tip 14 is made of a Superhard material, which is a material with a hardness value exceeding 40 gigapascals (GPa) when measured by the Vickers hardness test. In one embodiment, the Superhard material comprises solid cubic boron nitride (CBN or c-BN) or polycrystalline cubic boron nitride (PCBN) having a hardness between about 55 to about 62 GPa. The micro end mill 10 has a cutting diameter of between about 0.5 mm to about 10 mm. The cutting tip 14 is bonded to the shank 12 using a suitable bonding technique, such as brazing, and the like.

In general, the method of making the end mill 10 of the invention comprises three basic steps: 1) producing a billet made of a Superhard material using laser radiation; 2) brazing the billet to a shank of an end mill, the shank made of different material than the billet; and 3) removing material from the billet using laser radiation to produce a cutting tip made of the Superhard material. In one embodiment, the end mill comprises a micro end mill for use in electronic applications.

Figure 2:
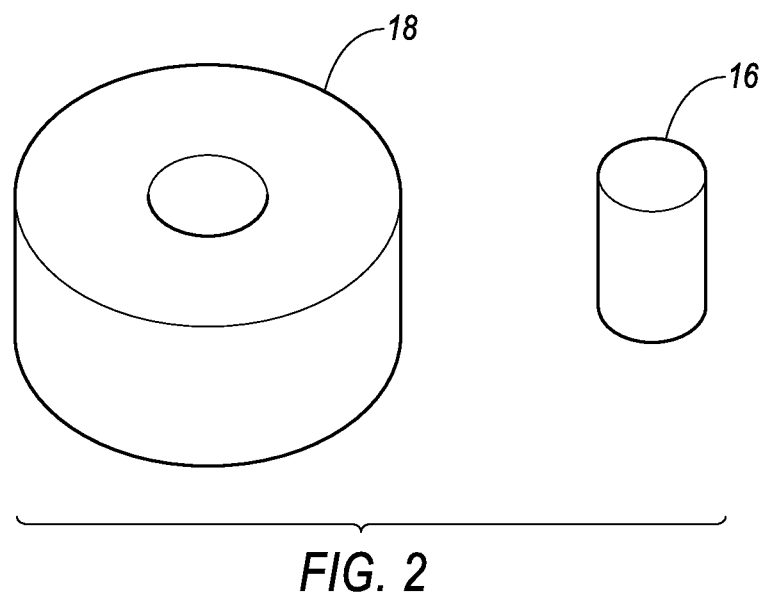
FIG. 2 is an isometric view of a round disc of Superhard material and a billet produced from the round disc using laser radiation according to a method of the invention.
Figure 3:
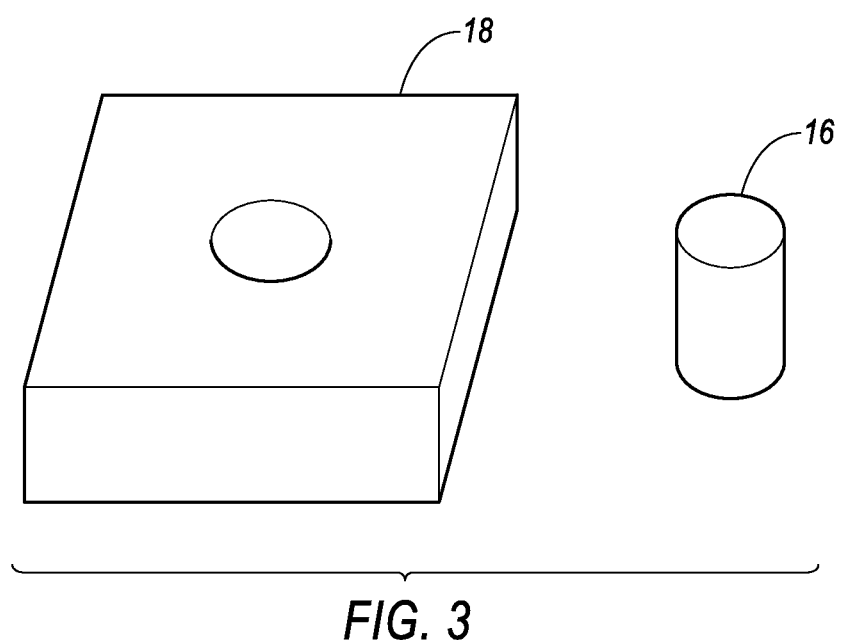
FIG. 3 is an isometric view of a square disc of Superhard material and a billet produced from the square disc using laser radiation according to a method of the invention.

Referring now to FIGS. 2 and 3, a billet 16 made of Superhard material is produced from a disc 18 of Superhard material by laser radiation using a laser beam technique. The billet 10 produced by laser radiation is generally cylindrical in shape, while the disc 18 can be any desirable shape. For example, the disc 18 can be a circle, as shown in FIG. 2. In another example, the disc 18 can be a square, as shown in FIG. 3. The cylindrical-shaped billet 10 can have any desirable diameter and a thickness of up to 15 mm. In one embodiment, the Superhard material having a hardness between 48 to 62 GPa. For example, the Superhard material may comprise solid cubic boron nitride (CBN or c-BN), polycrystalline cubic boron nitride (PCBN), ceramic, polycrystalline diamond (PCD), and the like.

One laser beam technique to produce the billet of Superhard material is known as Laser MicroJet® that is commercially available from SYNOVA located in Ecublens, Switzerland (www.synova.ch). In general, Laser MicroJet® technology combines a laser beam with a low-pressure, pure de-ionized and filtered water jet, which cools the cutting surface and offers extreme precision debris removal. Laser MicroJet® technology involves generating a water jet using small nozzles (20-160 μm) made of sapphire or diamond, and low water pressure (100-300 bar). The water jet is not involved in the cutting operation. A high-power pulsed laser beam is focused into a nozzle in a water chamber. Lasers are pulsed with a pulse duration in the micro- or nano-second range, for example, 10 fs to 1 millisecond, and operating at a frequency of 1064 nm (IR), 532 nm (Green), or 355 nm (UV). The laser beam is guided by total inter reflection at the water/air interface, in a manner similar to conventional glass fibers, to a disk of super hard material, such as Cubic Boron Nitride (CBN), Polycrystalline Diamonds (PCD), tungsten carbide (WC), and the like. Laser MicroJet® technology has a long working distance (>100 mm).

Another similar laser beam technique using laser ablation by encasing a laser beam in a water jet is commercially available from Avonisys AG located in Zug, Switzerland (http://www.avonisys.com).

Another laser beam technique is commercially available from GFH GmbH located in Deggenforf, Germany (www.gfh-gmbh.de). This laser beam technique uses a rotating telescope of cylindrical lenses that causes rotation of the laser beam to produce a laser beam that is substantially uniform in power density. As a result, this laser beam technique can produce positive conical bores in which the entrance diameter is larger than the outlet diameter, a cylindrical bore in which the entrance and outlet diameters are equal, or negative conical bores in which the entrance diameter is smaller than the outlet diameter. The resulting bores are free of burrs and have a roundness of +/−1%.

Another laser beam technique is to use a machine equipped with a galvanometer to machine the three-dimensional cavities that make the helical flute. However, a laser beam with a variety of energy intensity distribution profiles can be adapted to achieve the best topography in the three-dimensional cavity and the cutting edge. It should be appreciated that this technique is not limited to a Gaussian laser beam profile, and that the invention can be practiced using Top-Hat or Square intensity profiles.

Figure 4:
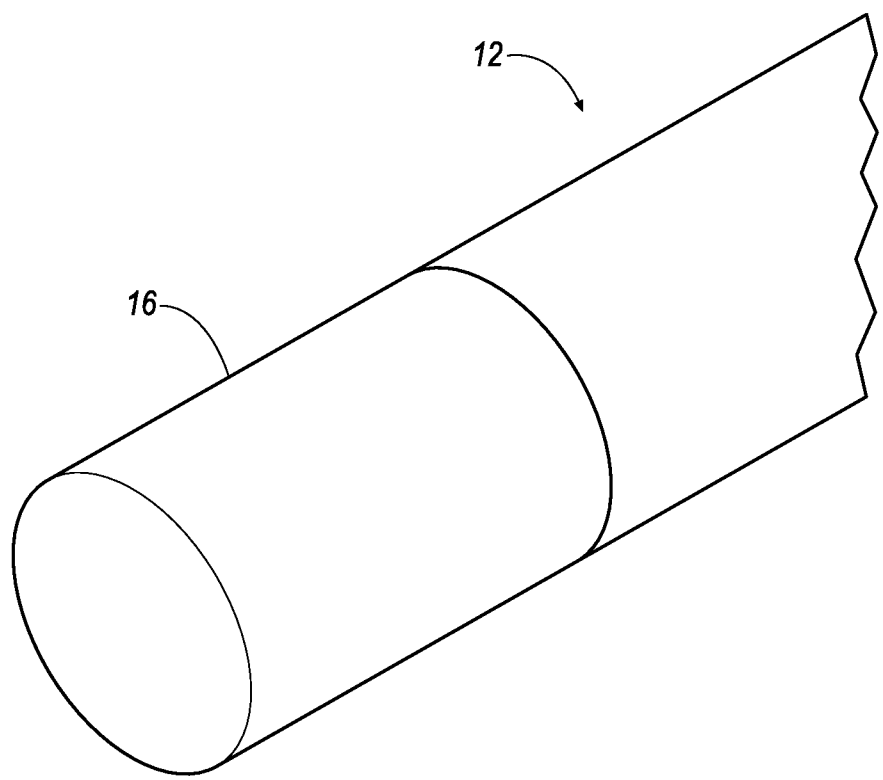
FIG. 4 is an enlarged, isometric view of the billet bonded to a shank of the micro end mill according to a method of the invention.

Next, the billet 16 is bonded to the shank 12 of the end mill 10 using a bonding technique. For example, the billet 16 is brazed to the shank 12, as shown in FIG. 4. However, it will be appreciated that the invention is not limited by the particular bonding technique, and that the invention can be practiced using any desirable bonding technique known to those skilled in the art.

Then, one of the laser beam techniques described above is used to machine the billet 16 to the desired final shape of the cutting tip 14 of the end mill 10. In addition to removing a three-dimensional volume to create helical flutes and the cutting edges, the above techniques can be used to assist with truing the CBN or similar tip material with respect to the shank made of HSS or carbide.

As mentioned above, the micro end mill 10 has a cutting diameter of between about 0.5 mm to about 10 mm. Currently, it is highly challenging to efficiently produce a cutting tip made of Superhard material with such a small cutting diameter using conventional machining techniques, such as grinding, and the like. The present invention solves this problem by using laser radiation to manufacture a cutting tip made of Superhard material that is bonded to a shaft that can be made of a different material.

Figure 5:
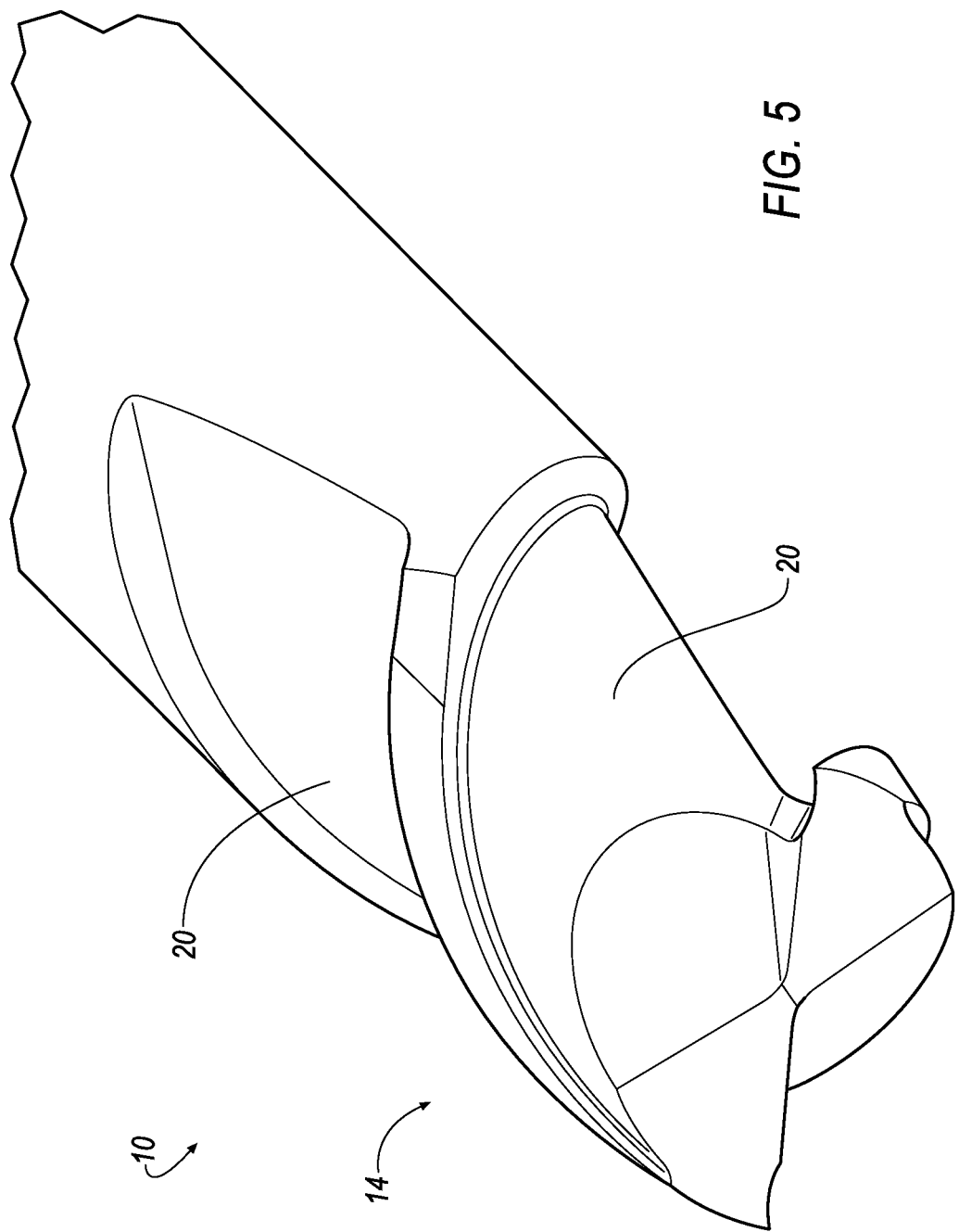
FIG. 5 is an enlarged, isometric view of the billet of FIG. 4 machined using laser radiation to produce a micro end mill having a cutting tip with two helical flutes according to a method of the invention.
Figure 6:
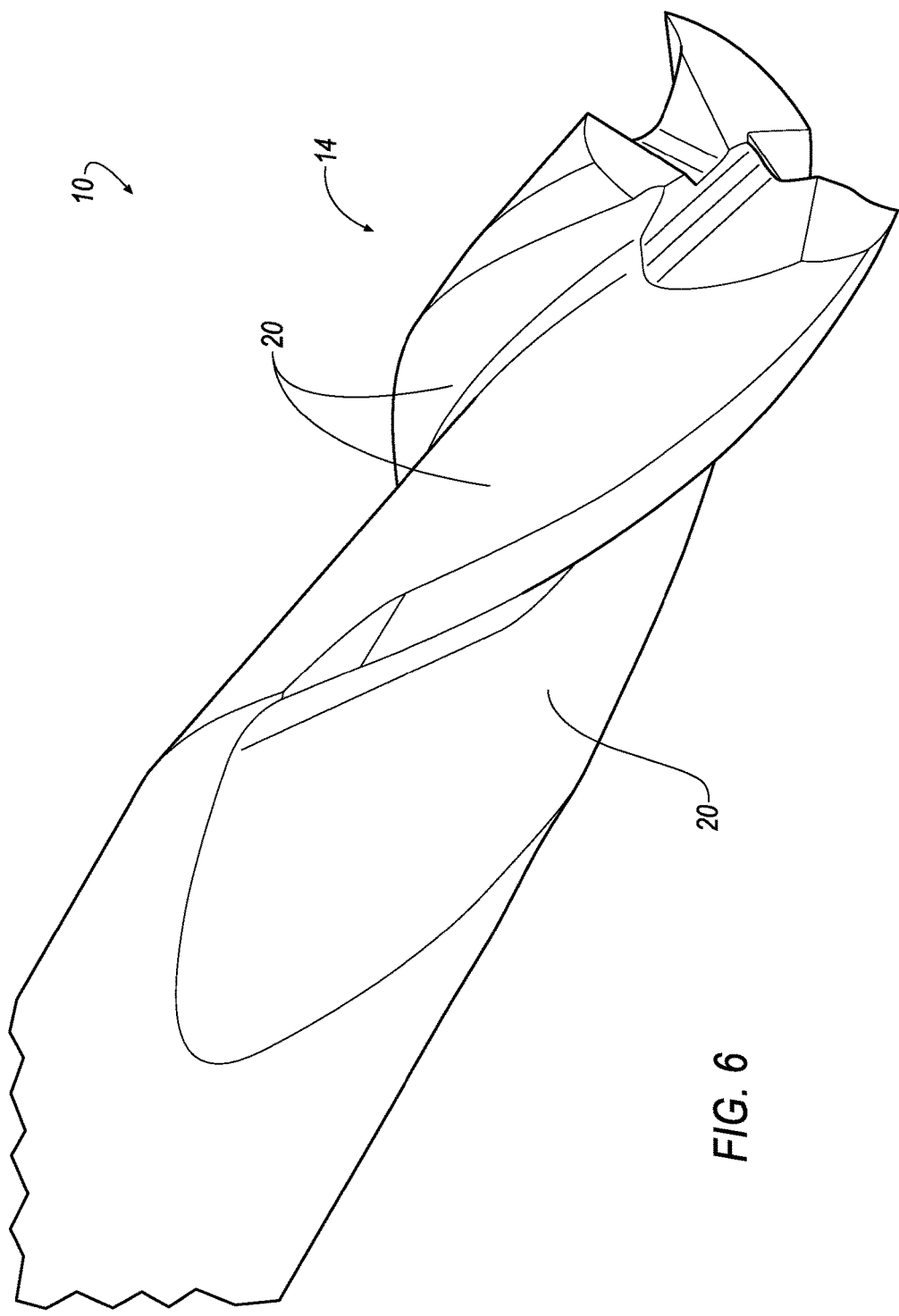
FIG. 6 is an enlarged, isometric view of the billet of FIG. 4 machined using laser radiation to produce a micro end mill having a cutting tip with three helical flutes according to a method of the invention.
Figure 7:
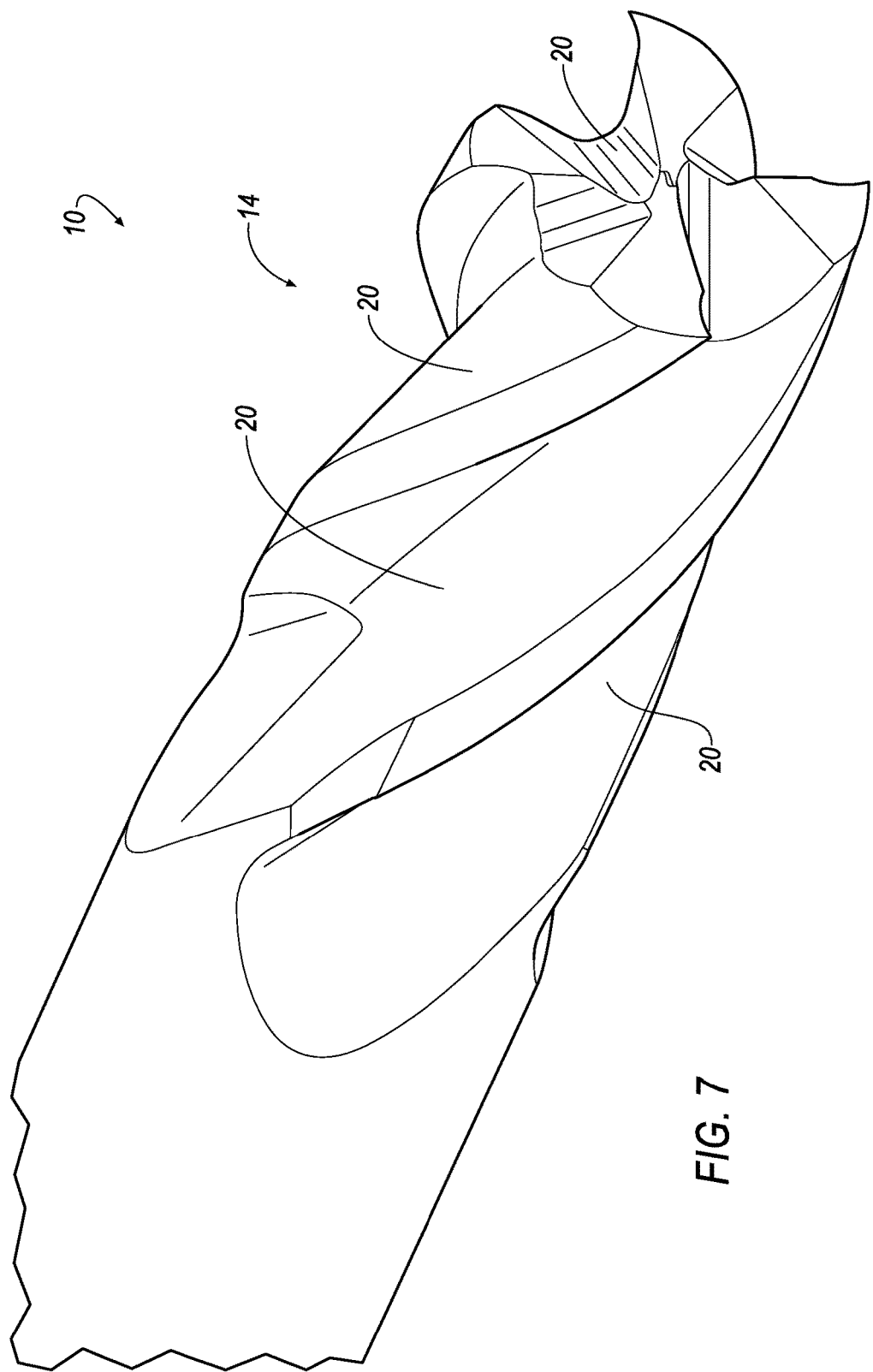
FIG. 7 is an enlarged, isometric view of the billet of FIG. 4 machined using laser radiation to produce a micro end mill having a cutting tip with four helical flutes according to a method of the invention.
Figure 8:
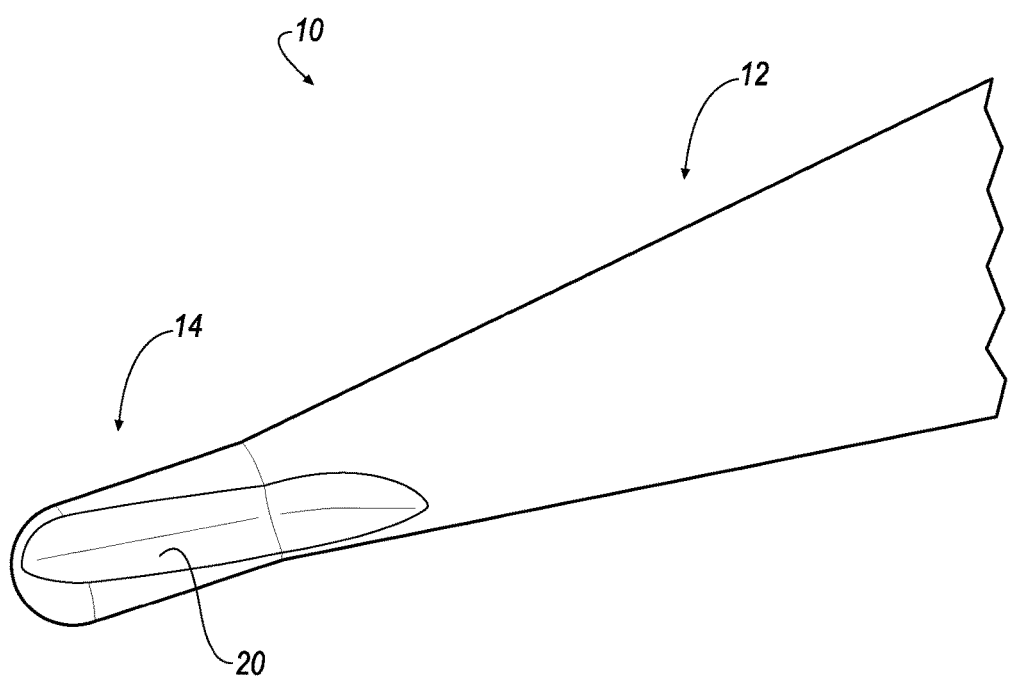
FIG. 8 is a partial, isometric view of the billet of FIG. 4 machined using laser radiation to produce a micro ball nose end mill having a cutting tip with two or more helical flutes according to a method of the invention.

The micro end mill 10 manufactured using the method of the invention can have many final shapes. One final shape of the micro end mill 10 is a cutting tip 14 having two helical flutes 20, as shown in FIG. 5. However, it will be appreciated that the invention is not limited by the number of helical flutes 20, and that the method of the invention can be practiced to produce a cutting tip 14 with any number of helical flutes 20. For example, the micro end mill 10 manufactured using the method of the invention can have a cutting tip 14 with three helical flutes 20, as shown in FIG. 6. In another example, the micro end mill 10 manufactured using the method of the invention can have a cutting tip 14 with four helical flutes 20, as shown in FIG. 7. In yet another example, the micro end mill 10 may comprise a micro ball nose end mill having a cutting tip 14 with two or more helical flutes 20, as shown in FIG. 8.

The patents and publications referred to herein are hereby incorporated by reference.

Having described presently preferred embodiments the invention may be otherwise embodied within the scope of the appended claims.

What is claimed is:

1. A method of manufacturing a micro end mill with a cutting tip, comprising:
   producing a billet made of Superhard material using laser radiation;
   bonding the billet to a shank of the end mill, the shank made of different material than the billet; and
   removing material from the billet using laser radiation to produce a cutting tip made of the Superhard material;
   wherein the laser radiation comprises a laser beam encased in a water jet.

2. The method of claim 1, wherein the Superhard material has a hardness value exceeding 40 gigapascals (GPa).

3. The method of claim 2, wherein the Superhard material has a hardness value between 55 to 62 GPa.

4. The method of claim 1, wherein the Superhard material comprises one of cubic boron nitride (CBN), polycrystalline cubic boron nitride (PCBN), ceramic and polycrystalline diamond (PCD), and wherein the shank is made of one of carbide and high speed steel (HSS).

5. The method of claim 1, wherein the cutting tip has a plurality of helical flutes.

6. The method of claim 1, wherein the micro end mill has a cutting diameter of between 0.5 mm to 10 mm.

7. The method of claim 1, wherein the billet is bonded to the shank by brazing.

8. The method of claim 1, wherein the laser radiation has a non-Gaussian intensity profile.

9. A micro end mill manufactured using the method of claim 1, the micro end mill comprising a cutting tip made of the Superhard material bonded to a shank made of a different material.

10. The end mill of claim 9, wherein the cutting tip has a plurality of helical flutes.

11. The end mill of claim 9, wherein the shank is made of one of carbide and high speed steel (HSS).

12. The end mill of claim 9, wherein the Superhard material has a hardness value exceeding 40 gigapascals (GPa).

13. The end mill of claim 12, wherein the Superhard material has a hardness value between 55 to 62 GPa.

14. The end mill of claim 9, wherein the Superhard material comprises one of cubic boron nitride (CBN), polycrystalline cubic boron nitride (PCBN), ceramic and polycrystalline diamond (PCD), and wherein the shank is made of one of carbide and high speed steel (HSS).

15. A method of manufacturing a micro end mill with a cutting tip, comprising:
   producing via laser radiation, from a disc of Superhard material, a billet made of the Superhard material;
   bonding the billet to a shank of the micro end mill, the shank made of different material than the billet; and
   thereafter machining the billet to a final predetermined shape, to produce a cutting tip made of the Superhard material;
   said machining comprising removing material from the billet using laser radiation;
   wherein said removing comprises removing a three-dimensional volume from the billet using laser radiation, to create helical flutes and cutting edges.

16. The method of claim 15, wherein the billet is generally cylindrical in shape.

17. The method of claim 16, wherein the billet has a thickness of up to about 15 mm.

18. The method of claim 15, wherein the billet is bonded to the shank by brazing.

19. The method of claim 15, wherein the laser radiation comprises a laser beam encased in a water jet.

20. The method of claim 15, comprising truing the billet with respect to the shank via removing material from the billet using laser radiation.

* * * * *